(12) United States Patent
Mueller-Fischer et al.

(10) Patent No.: US 9,589,383 B2
(45) Date of Patent: Mar. 7, 2017

(54) UNIFIED POSITION BASED SOLVER FOR VISUAL EFFECTS

(71) Applicant: NVIDIA Corporation, Santa Clara, CA (US)

(72) Inventors: Matthias Mueller-Fischer, Uerikon (CH); Miles Macklin, Freemans Bay (NZ)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 14/145,840

(22) Filed: Dec. 31, 2013

(65) Prior Publication Data

US 2015/0109309 A1    Apr. 23, 2015

Related U.S. Application Data

(60) Provisional application No. 61/893,057, filed on Oct. 18, 2013.

(51) Int. Cl.
*G06T 15/00* (2011.01)
*G06T 13/20* (2011.01)

(52) U.S. Cl.
CPC .......... *G06T 13/20* (2013.01); *G06T 2210/52* (2013.01); *G06T 2210/56* (2013.01)

(58) Field of Classification Search
CPC ..... G06T 13/80; G06T 13/20; G06T 2210/52; G06T 2210/56
USPC ........................................ 345/473, 474, 475
See application file for complete search history.

(56) References Cited

U.S. PATENT DOCUMENTS

| | | | |
|---|---|---|---|
| 5,953,239 A * | 9/1999 | Teixeira et al. | 703/6 |
| 6,815,245 B2 * | 11/2004 | Xu et al. | 438/57 |
| 7,091,973 B1 | 8/2006 | Cohen | |
| 7,191,191 B2 | 3/2007 | Peurach et al. | |
| 7,212,656 B2 | 5/2007 | Liu et al. | |
| 7,372,463 B2 | 5/2008 | Anand | |
| 7,542,040 B2 | 6/2009 | Templeman | |
| 7,643,685 B2 | 1/2010 | Miller | |
| 7,731,588 B2 | 6/2010 | Templeman | |
| 7,895,411 B2 * | 2/2011 | Maher et al. | 712/3 |
| 7,921,003 B2 | 4/2011 | Miller et al. | |
| 7,948,485 B1 | 5/2011 | Larsen et al. | |

(Continued)

OTHER PUBLICATIONS

Bodin, et al., Constraint Fluids, IEEE Transactions of Visualization and Computer Graphics, Mar. 2012, vol. 18.

(Continued)

*Primary Examiner* — Phu K Nguyen

(57) ABSTRACT

A method for simulating visual effects is disclosed. The method comprises modeling each visual effect within a simulation as a set of associated particles with associated constraints applicable thereto. It also comprises predicting first velocities and first positions of a plurality of particles being used to simulate a visual effect based on an external force applied to the plurality of particles. Next, it comprises identifying a set of neighboring particles for each of the plurality of particles. The method also comprises solving a plurality of constraints related to the visual effect, wherein each of the plurality of constraints is solved for the plurality of particles in parallel. Lastly, responsive to the solving, the method comprises determining second velocities and second positions for the plurality of particles.

25 Claims, 17 Drawing Sheets

(56) References Cited

U.S. PATENT DOCUMENTS

| | | | |
|---|---|---|---|
| 8,186,913 B2 | 5/2012 | Toner et al. | |
| 8,269,778 B1 | 9/2012 | Baraff et al. | |
| 8,327,388 B2 * | 12/2012 | Muller et al. | 719/328 |
| 8,386,225 B2 * | 2/2013 | Bourbiaux | E21B 43/00 703/10 |
| 8,803,887 B2 * | 8/2014 | McAdams et al. | 345/473 |
| 8,807,879 B2 | 8/2014 | Toner et al. | |
| 8,810,590 B2 * | 8/2014 | Oat et al. | 345/552 |
| 8,878,856 B1 | 11/2014 | Chentanez et al. | |
| 8,903,693 B2 * | 12/2014 | McDaniel et al. | 703/9 |
| 8,930,969 B2 * | 1/2015 | Muller-Fischer et al. | 719/328 |
| 8,941,826 B2 | 1/2015 | Nawaz et al. | |
| 9,037,440 B2 * | 5/2015 | Sun et al. | 703/2 |
| 9,070,221 B1 * | 6/2015 | Soares | G06T 17/00 |
| 2002/0149622 A1 | 10/2002 | Uesaki et al. | |
| 2006/0085088 A1 | 4/2006 | Nakayama et al. | |
| 2007/0085851 A1 | 4/2007 | Muller et al. | |
| 2010/0214313 A1 | 8/2010 | Herman et al. | |
| 2010/0235769 A1 | 9/2010 | Young et al. | |
| 2015/0161810 A1 | 6/2015 | Macklin et al. | |

OTHER PUBLICATIONS

Clavet, et al., Particle-based Viscoelastic Fluid Simulation, Eurographics/ACM SIGGRAPH Symposium on Computer Animation, 2005. The Eurographics Association 2005. LIGUM, Dept. IRO, Univerite de Montreal.

Macklin, et al., Position Based Fluids, ACM Transactions on Graphics, vol. 32, Issue 4.

Monaghan, Smoothed particle hydrodynamics, Reports on Progress in Physics, 2005, 1703-1759, vol. 68, Institute of Physics Publishing.

Monaghan, SPH without a Tensile Instability, Journal of Computational Physics, 2000, 290-311, vol. 159, Academic Press.

Muller, et al., Position Based Dynamics, 3rd Workshop in Virtual Reality Interactions and Physical Simulation "VRIPHYS", 2006.

Miklos, Real-Time Fluid Simulation Using Height Fields, Swiss Federal Institute of Technology Zurich, Master Thesis, Summer 2004, pp. 1-42.

Fedkiw et al., "Visual Simulation of Smoke", Proceedings of the 28th Annual Conference on Computer Graphics and Interactive Techniques, ACM, 2001.

* cited by examiner

```
struct Particle
{
    float3 x;
    float3 v;
    float invmass;
660 ─────→int phase;
};
```

FIG. 6

Figure 1: *A particle constrained to lie at the origin by two identical distance constraints*

Algorithm 1 Particle-Centric Solve (gather)
───────────────────────────────────────────────
1: for all particles $i$ in parallel do
2:    initialize position delta $\Delta x_i = 0$
3:    for all constraint $c$ affecting $i$ do
4:       calculate constraint error and gradient $\lambda_c$
5:       update delta $\Delta x_i + = \lambda_c \Delta C_i$
6:    end for
7:    update particle $x_i$
8: end for
───────────────────────────────────────────────

FIG. 8A

Algorithm 2 Constraint-Centric Solve (scatter)
───────────────────────────────────────────────
1: for all particles $i$ in parallel do
2:    initialize position delta $\Delta x_i = 0$
3: end for
4: for all constraints $c$ in parallel do
5:    calculate constraint error $\lambda_c$
6:    for all particles $i$ do
7:       calculate constraint gradient $\Delta C_i$
8:       atomically update particle delta $\Delta x_i + = \lambda_c \Delta C_i$
9:    end for
10: end for
───────────────────────────────────────────────

FIG. 8B

Algorithm 3 Simulation Loop

```
 1: for all particles i do
 2:     apply forces v_i ⇐ v_i + Δtf_ext(x_i)
 3:     predict position x_i* ⇐ x_i + Δtv_i
 4:     apply mass scaling m_i* = m_i e^{-kh(x_i*)}
 5: end for
 6: for all particles i do
 7:     find neighboring particles N_i(x_i*)
 8: end for
 9: while iter < solverIterations do
10:     solve density constraints
11:     solve rigid constraints
12:     solve distance constraints
13:     solve pressure constraints
14:     solve contact constraints
15: end while
16: for all particles i do
17:     update velocity v_i ⇐ (1/Δt)(x_i* − x_i)
18:     apply viscosity, vorticity confinement and dissipation
19: end for
```

FIG. 9

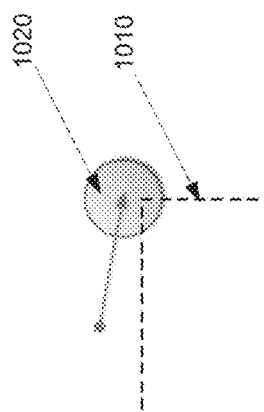
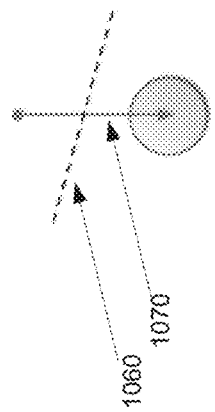
FIG. 10A
FIG. 10B

UNIFIED POSITION BASED SOLVER FOR VISUAL EFFECTS

CROSS-REFERENCE TO RELATED APPLICATIONS

Related Applications

This application is a conversion of and claims priority to and the benefit of Provisional Patent Application Ser. No. 61/893,057, entitled "UNIFIED POSITION BASED SOLVERS FOR VISUAL EFFECTS," having a filing Date of Oct. 18, 2013, which is herein incorporated by reference in its entirety.

The present application is related to U.S. patent application Ser. No. 14/102,323, filed Dec. 10, 2013, entitled "POSITION BASED FLUID DYNAMICS SIMULATION," naming Miles Macklin and Matthias Müller as inventors. That application is incorporated herein by reference in its entirety and for all purposes.

The present application is related to U.S. patent application Ser. No. 14/145,826, filed Dec. 31, 2013, entitled "METHOD AND APPARATUS FOR SIMULATING STIFF STACKS," naming Matthias Müller-Fischer and Miles Macklin as inventors. That application is incorporated herein by reference in its entirety and for all purposes.

FIELD OF THE INVENTION

Embodiments according to the present invention generally relate to graphics processing units (GPUs) and more specifically to rendering computer graphics using GPUs.

BACKGROUND OF THE INVENTION

The field of physically based animation in computer graphics involves simulation of physical phenomenon such as the dynamics of rigid bodies, clothing, deformable objects or fluid flow.

One conventional approach has been to simulate dynamic objects by computing forces acting on an object over time steps. At the beginning of each time step, internal and external forces are accumulated. Examples of internal forces are elastic forces in deformable objects or viscosity and pressure forces in fluids. Gravity and collision are examples of external forces. It is well known that Newton's second law of motion relates forces to accelerations via the mass. Using the density or lumped masses of vertices, the forces can then be transformed into acceleration values. Subsequently, any time integration scheme can be used to first compute the velocities from the accelerations and then the positions from the velocities. Some approaches alternatively use impulses instead of forces to control the animation.

Another conventional approach to simulating dynamic objects involves using position based dynamics. A position based approach eliminates the velocity layer and immediately works on the positions. In computer graphics and especially in computer games, it is often desirable to have direct control over positions of objects or vertices of a mesh. The user may want to attach a vertex to a kinematic object or ensure the vertex always stay outside a colliding object. In such cases, it is beneficial to have an approach that works directly on the positions of objects, which makes such manipulations more efficient. In addition, with the position based approach it is possible to control the integration directly, thereby, avoiding overshooting and energy gain problems in connection with explicit integration.

Software-based constraint solvers are typically used in simulation systems, e.g. position based systems to ensure that the dynamic objects being simulated satisfy a series of predefined physical constraints. Visual effects are typically built using a combination of different physics solvers, e.g., a solver for rigid bodies, a solver for fluids, a solver for clothing etc. One shortcoming of implementing separate solvers is that the different solver systems are not usually able to interact with each other, which makes two-way coupling between different objects or materials difficult, e.g., having simulated fluid dynamics interact with simulated cloth etc. Further, there is often significant overlap between the solver systems functionally to where it is inefficient to implement separate solver systems. For example, collision detection and response functionality is similar for different solver systems. Implementing separate solvers therefore, creates redundancies.

BRIEF SUMMARY OF THE INVENTION

Accordingly, a need exists for a unified constraint solver that models several different types of materials and objects, e.g., rigid bodies, clothing, liquids etc. using a single general-purpose framework. Further, a need exists for a unified constraint solver that allows two-way coupling between the different types of objects and materials.

In one embodiment, the present invention avoids the duplicating effort involved in maintaining different solvers and provides functionality for all types of materials and objects in a unified manner within one general purpose solver system. In one embodiment, the present invention provides a unified constraint solver system for position based simulation systems that simulates rigid bodies, fluids and other materials, e.g. clothing, within a single unified solver and also allows for two-way coupling between the different types of objects and materials. Further, in one embodiment, the unified solver system is designed to take advantage of parallel architectures such as GPUs, wherein different sets of constraints can be solved in a parallel fashion.

In one embodiment, a method for simulating visual effects is disclosed. The method first comprises modeling each visual effect within a simulation as a set of associated particles with associated constraints applicable thereto. It also comprises predicting first velocities and first positions of a plurality of particles being used to simulate a visual effect based on an external force applied to the plurality of particles. Next, it comprises identifying a set of neighboring particles for each of the plurality of particles. The method also comprises solving a plurality of constraints related to the visual effect, wherein each of the plurality of constraints is solved for the plurality of particles in parallel. Lastly, responsive to the solving, the method comprises determining second velocities and second positions for the plurality of particles.

In another embodiment, a non-transitory computer-readable storage medium having stored thereon, computer executable instructions that, if executed by a computer system cause the computer system to perform a method of simulating visual effects is disclosed. The method first comprises modeling each visual effect within a simulation as a set of associated particles with associated constraints applicable thereto. It also comprises predicting first velocities and first positions of a plurality of particles being used to simulate a visual effect based on an external force applied to the plurality of particles. Next, it comprises identifying a set of neighboring particles for each of the plurality of particles. The method also comprises solving a plurality of constraints related to the visual effect, wherein each of the plurality of constraints is solved for the plurality of particles in parallel. Lastly, responsive to the solving, the method comprises determining second velocities and second positions for the plurality of particles.

In a different embodiment, a system for simulating visual effects is disclosed. The system comprises a memory storing information related to a unified position based solver and a processor coupled to the memory, the processor operable to implement a method of solving for visual effects. The method first comprises modeling each visual effect within a simulation as a set of associated particles with associated constraints applicable thereto. It also comprises predicting first velocities and first positions of a plurality of particles being used to simulate a visual effect based on an external force applied to the plurality of particles. Next, it comprises identifying a set of neighboring particles for each of the plurality of particles. The method also comprises solving a plurality of constraints related to the visual effect, wherein each of the plurality of constraints is solved for the plurality of particles in parallel. Lastly, responsive to the solving, the method comprises determining second velocities and second positions for the plurality of particles.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

FIG. 6 illustrates the state that each particle in a system can comprise in accordance with embodiments of the invention.

FIG. 8A illustrates an exemplary procedure for solving constraints in a particle-centric way in accordance with embodiments of the present invention FIG. 8B illustrates an exemplary procedure for solving constraints in a constraint-centric manner in accordance with embodiments of the present invention.

FIG. 9 illustrates an exemplary procedure for a unified solver to simulate visual effects using particles as building blocks in accordance with embodiments of the invention.

FIG. 10A illustrates the manner in which the "lollipop test" determines a line-segment to triangle intersection according to embodiments of the invention.

FIG. 10B illustrates the manner in which the "lollipop test" determines a line-segment to triangle intersection using a sphere to triangle overlap test according to embodiments of the invention.

Figure 1:
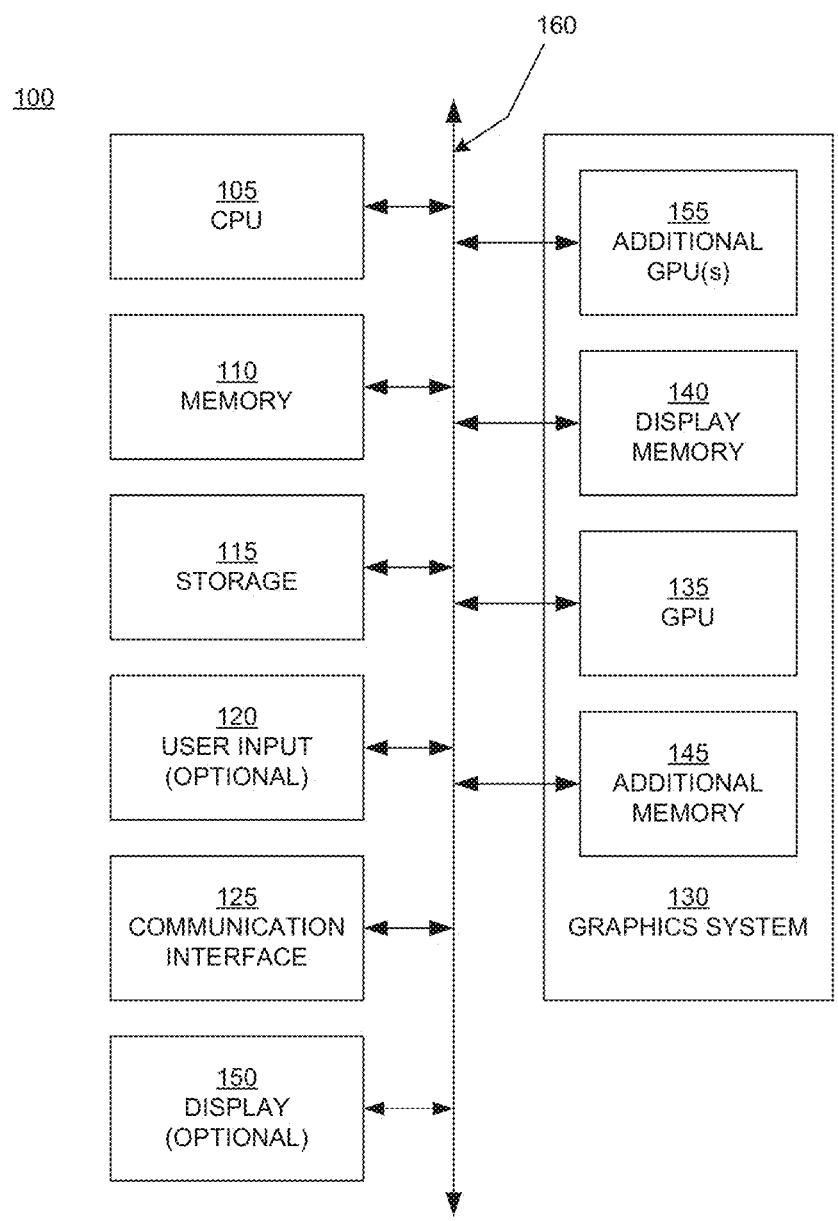
FIG. 1 is a block diagram of an example of a computing system capable of implementing embodiments according to the present invention.

In the figures, elements having the same designation have the same or similar function.

DETAILED DESCRIPTION OF THE INVENTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims.

Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Portions of the detailed description that follows are presented and discussed in terms of a process or method. Although steps and sequencing thereof are disclosed in figures (e.g. FIG. 17) herein describing the operations of this method, such steps and sequencing are exemplary. Embodiments are well suited to performing various other steps or variations of the steps recited in the flowchart of the figure herein, and in a sequence other than that depicted and described herein.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "predicting," "finding," "solving," "updating," "determining," and "applying," "identifying," or the like, refer to actions and processes of a computer system (e.g., flowchart 1750 of FIG. 17) or similar electronic computing device or processor (e.g., system 100 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Further, while embodiments described herein may make reference to a GPU, it is to be understood that the circuits and/or functionality described herein could also be implemented in other types of processors, such as general-purpose or other special-purpose coprocessors, or within a CPU.

FIG. 1 is a block diagram of an example of a computer system 100 capable of implementing embodiments according to the present invention. In one embodiment, an application server as described herein may be implemented on exemplary computer system 100.

In the example of FIG. 1, the computer system 100 includes a central processing unit (CPU) 105 for running software applications and optionally an operating system. Memory 110 stores applications and data for use by the CPU 105. Storage 115 provides non-volatile storage for applications and data and may include fixed disk drives, removable disk drives, flash memory devices, and CD-ROM, DVD-ROM or other optical storage devices. The optional user input 120 includes devices that communicate user inputs from one or more users to the computer system 100 and may include keyboards, mice, joysticks, touch screens, and/or microphones.

The communication or network interface 125 allows the computer system 100 to communicate with other computer systems via an electronic communications network, including wired and/or wireless communication and including an Intranet or the Internet. In one embodiment, the computer system 100 receives instructions and user inputs from a remote computer through communication interface 125. Communication interface 125 can comprise a transmitter and receiver for communicating with remote devices.

The optional display device 150 may be any device capable of displaying visual information in response to a signal from the computer system 100.

The components of the computer system 100, including the CPU 105, memory 110, data storage 115, user input devices 120, communication interface 125, and the display device 150, may be coupled via one or more data buses 160.

In the embodiment of FIG. 1, a graphics system 130 may be coupled with the data bus 160 and the components of the computer system 100. The graphics system 130 may include a physical graphics processing unit (GPU) 135 and graphics memory. The GPU 135 generates pixel data for output images from rendering commands.

The physical GPU 135 can be configured as multiple virtual GPUs that may be used in parallel (concurrently) by a number of applications or processes executing in parallel. For example, a variety of constraint solving processes may be run in parallel on the multiple virtual GPUs.

Graphics memory may include a display memory 140 (e.g., a framebuffer) used for storing pixel data for each pixel of an output image. In another embodiment, the display memory 140 and/or additional memory 145 may be part of the memory 110 and may be shared with the CPU 105. Alternatively, the display memory 140 and/or additional memory 145 can be one or more separate memories provided for the exclusive use of the graphics system 130.

In another embodiment, graphics processing system 130 includes one or more additional physical GPUs 155, similar to the GPU 135. Each additional GPU 155 may be adapted to operate in parallel with the GPU 135. Each additional GPU 155 generates pixel data for output images from rendering commands. Each additional physical GPU 155 can be configured as multiple virtual GPUs that may be used in parallel (concurrently) by a number of applications or processes executing in parallel, e.g. processes that solve constraints. Each additional GPU 155 can operate in conjunction with the GPU 135, for example, to simultaneously generate pixel data for different portions of an output image, or to simultaneously generate pixel data for different output images.

Each additional GPU 155 can be located on the same circuit board as the GPU 135, sharing a connection with the GPU 135 to the data bus 160, or each additional GPU 155 can be located on another circuit board separately coupled with the data bus 160. Each additional GPU 155 can also be integrated into the same module or chip package as the GPU 135. Each additional GPU 155 can have additional memory, similar to the display memory 140 and additional memory 145, or can share the memories 140 and 145 with the GPU 135.

Figure 2:
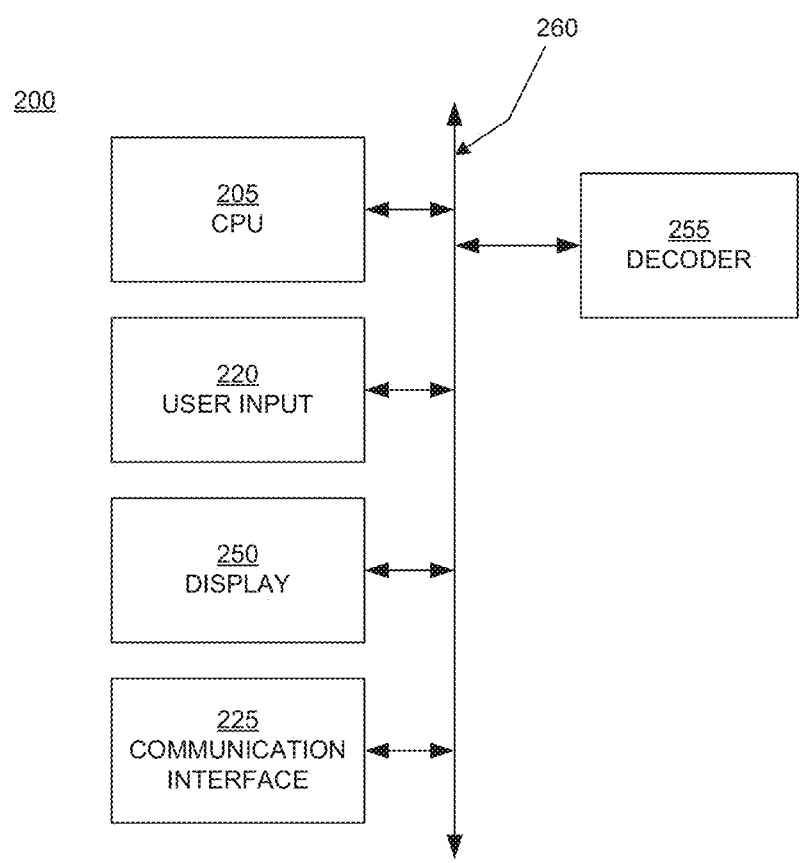
FIG. 2 is a block diagram of an example of an end user or client device capable of implementing embodiments according to the present invention.

FIG. 2 is a block diagram of an example of an end user or client device 200 capable of implementing embodiments according to the present invention. In the example of FIG. 2, the client device 200 includes a CPU 205 for running software applications and optionally an operating system. The user input 220 includes devices that communicate user inputs from one or more users and may include keyboards, mice, joysticks, touch screens, and/or microphones. The communication interface 225 allows the client device 200 to communicate with other computer systems (e.g., the computing system 100 of FIG. 1) via an electronic communications network, including wired and/or wireless communication and including the Internet.

The decoder 255 may be any device capable of decoding (decompressing) data that may be encoded (compressed). For example, the decoder 255 may be an H.264 decoder. The display device 250 may be any device capable of displaying visual information, including information received from the decoder 255. In particular, as will be described below, the display device 250 may be used to display visual information received from the computing system 100. The components of the client device 200 may be coupled via one or more data buses 260.

Relative to the computing system 100, the client device 200 in the example of FIG. 2 may have fewer components and less functionality and, as such, may be referred to as a thin client. However, the client device 200 may include other components including those described above. In general, the client device 200 may be any type of device that has display capability, the capability to decode (decompress) data, and the capability to receive inputs from a user and send such inputs to the computing system 100. However, the client device 200 may have additional capabilities beyond those just mentioned. The client device 200 may be, for example, a personal computer, a tablet computer, a mobile device, a gaming console, a television, or the like.

Figure 3:
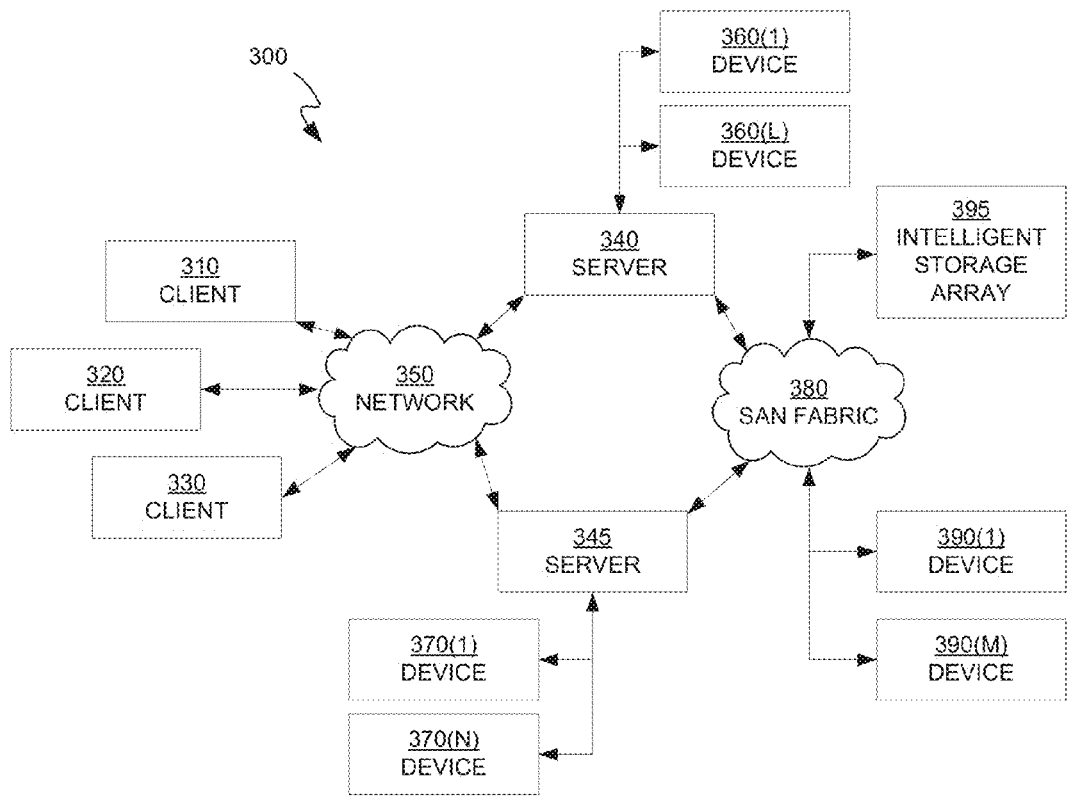
FIG. 3 is a block diagram of an example of a network architecture in which client systems and servers may be coupled to a network.

FIG. 3 is a block diagram of an example of a network architecture 300 in which client systems 310, 320, and 330 and servers 340 and 345 may be coupled to a network 350. Client systems 310, 320, and 330 generally represent any type or form of computing device or system, such as computing system 100 of FIG. 1.

Similarly, servers 340 and 345 generally represent computing devices or systems, such as application servers or database servers, configured to provide various database services and/or run certain software applications. Network 350 generally represents any telecommunication or computer network including, for example, an intranet, a wide area network (WAN), a local area network (LAN), a personal area network (PAN), or the Internet.

With reference to computing system 100 of FIG. 1, a communication interface, such as communication interface 122, may be used to provide connectivity between each client system 310, 320, and 330 and network 350. Client systems 310, 320, and 330 may be able to access information on server 340 or 345 using, for example, a Web browser or other client software. Such software may allow client systems 310, 320, and 330 to access data hosted by server 340, server 345, storage devices 360(1)-(L), storage devices 370(1)-(N), storage devices 390(1)-(M), or intelligent storage array 395. Although FIG. 3 depicts the use of a network (such as the Internet) for exchanging data, the embodiments described herein are not limited to the Internet or any particular network-based environment.

In one embodiment, all or a portion of one or more of the example embodiments disclosed herein are encoded as a computer program and loaded onto and executed by server 340, server 345, storage devices 360(1)-(L), storage devices 370(1)-(N), storage devices 390(1)-(M), intelligent storage array 395, or any combination thereof. All or a portion of one or more of the example embodiments disclosed herein may also be encoded as a computer program, stored in server 340, run by server 345, and distributed to client systems 310, 320, and 330 over network 350.

Unified Position Based Solver for Visual Effects

Embodiments of the present invention provide a unified system for real-time visual effects simulation. Also, embodiments of the present invention provide a method and apparatus for a unified constraint solver that models several different types of materials and objects, e.g., rigid bodies, clothing, liquids etc. using a single general-purpose framework. Further, embodiments of the present invention provide a method and apparatus for a unified constraint solver that allows two-way coupling between the different types of objects and materials.

In one embodiment, the present invention avoids the duplicating effort involved in maintaining different solvers and provides functionality for all types of materials and objects in a unified manner within one general purpose solver framework. In one embodiment, the present invention provides a unified constraint solver system for position based simulation systems that simulates rigid bodies, fluids and other materials, e.g. clothing together using the unified solver and also allows for two-way coupling between the different types of objects and materials, e.g., rigid bodies, soft-bodies, granular materials, liquids, gases, etc. Further, in one embodiment, the unified solver system is designed to take advantage of parallel architectures such as GPUs, wherein different sets of constraints can be solved in a parallel fashion.

In contrast to conventional specialized solvers, the unified solver of the present invention advantageously allows simulation of a much wider range of effects by providing functionality for all types of materials and objects. Further, by using a unified interface and particle-based representation, the solver of the present invention allows these effects to interact with each other. Finally, the solver of the present invention is fully parallel making it efficient for GPU architectures.

Particle Representation

As discussed above, in one embodiment, the present invention is a parallel, particle-based solver for simulating effects including rigid bodies, granular materials, fluids, clothing, and ropes. The unified constraint solver of the present invention, in one embodiment, can comprise all the different types of constraints e.g., closing constraints, distance constraints, pressure and density constraints etc. within one system. Further, the way that shapes are described also needs to be unified in order for different types of objects and materials to be modeled using the same general purpose framework. Accordingly, in one embodiment, particles are chosen as the fundamental building block to model all objects.

In conventional systems, when simulating a rigid body, e.g., a chair, a triangle mesh or a convex hull would be chosen to model the chair, but such representations are not naturally applied to fluids, which change topology often. As stated above, in order to model different types of visual effects using a unified solver, the way that the visual effects are described need to be unified. Accordingly, in one embodiment of the present invention, the unified solver of the present invention uses spherical particles as the fundamental building block for all objects including rigid bodies. Further, it uses shape matching constraints to keep the particles rigidly locked together.

Figure 4A:
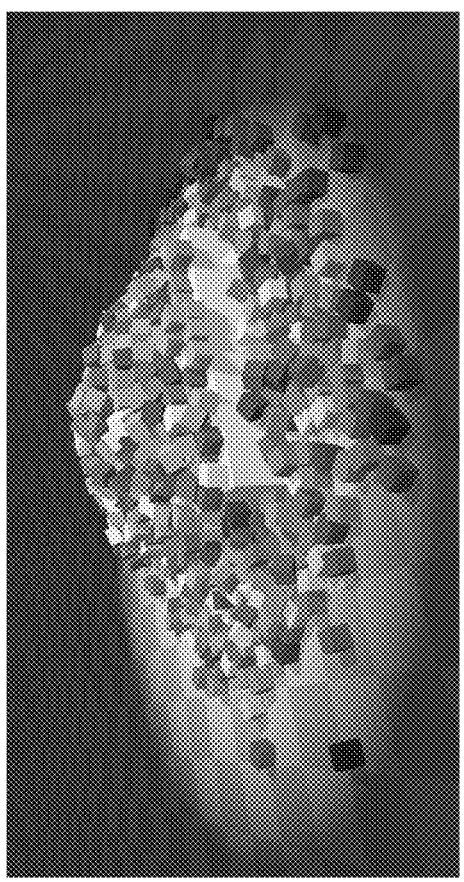
FIG. 4A illustrates a simulation scenario where certain rigid bodies are piled together.
Figure 4B:
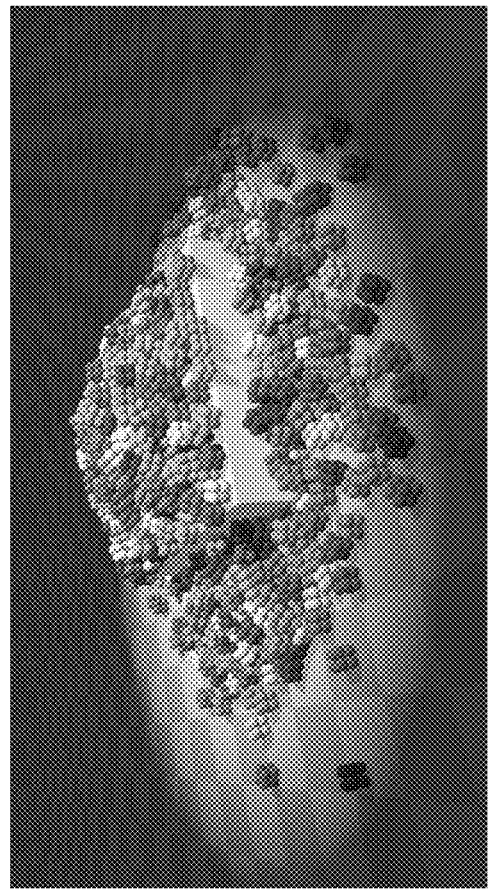
FIG. 4B illustrates a particle view of the rigid bodies from FIG. 4A in accordance with embodiments of the invention.

FIG. 4A illustrates a simulation scenario where certain rigid bodies are piled together. FIG. 4B illustrates a particle view of the rigid bodies from FIG. 4A in accordance with embodiments of the invention. As seen in FIG. 4B, the rigid bodies are represented using spherical particles in a departure from conventional methods which would use triangle meshes or convex hulls. Further, the particles are held together using shape matching constraints in order to create the visual effect of rigid bodies piled together as shown in FIG. 4A. For example, to model a chair, particles can be used to model the legs of the chair and shape matching constraints can be used to keep the particles in the legs of the chair rigidly locked to each other. Similarly, in order to model any object or material using a unified solver, a set of constraints is applied to a group of particles, wherein the set of constraints is tailored in accordance with the object or material that is being modeled. For example, the constraints to model a fluid would be different from the constraints applied to model a rigid body.

Figure 5:
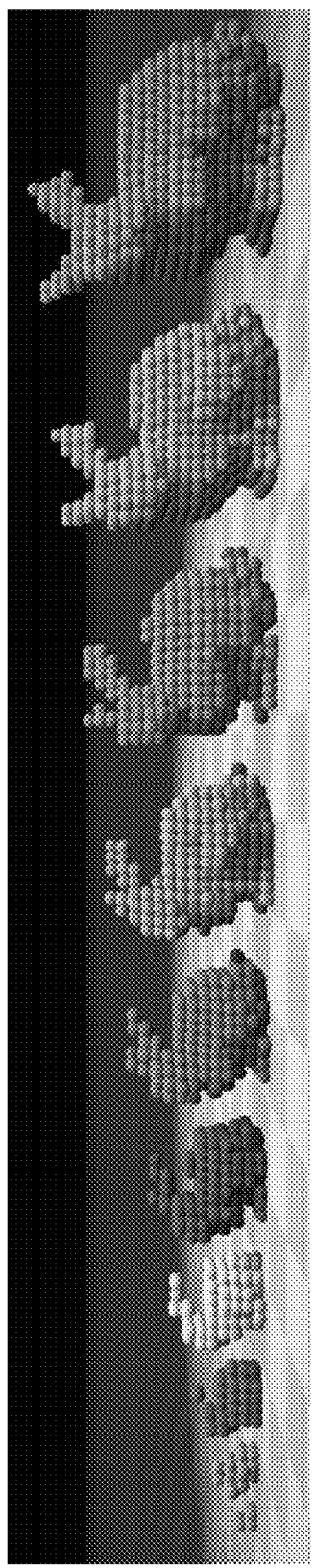
FIG. 5 illustrates an object, a bunny, at different sizes sampled by particles in accordance with embodiments of the invention.

FIG. 5 illustrates an object, a bunny, at different sizes sampled by particles in accordance with embodiments of the invention. As seen in FIG. 5, more particles are required to represent the larger sized bunnies than the smaller ones.

In one embodiment, large non-dynamic shapes such as walls and floors are represented by the unified solver of the present invention using conventional building blocks e.g., convex hulls, signed distance fields and triangle meshes. This is because particles can be an inefficient choice of collision primitive for large shapes.

In one embodiment of the present invention, the particles are restricted to a fixed radius per system in order to simplify collision detection and make collision handling efficient. FIG. 6 illustrates the state that each particle in a system can comprise according to embodiments of the invention. The particle phase identifier 660 is an integer value that can be used to organize particles into groups. It can also be used to provide a convenient way to adjust the properties of the particles and control how they interact. By way of example, a phase identifier of 0 can be assigned to represent fluid particles. Phase identifiers, in one embodiment, can be used to prevent particles in different phases from generating collisions.

Parallel Successive Over-Relaxation (SOR) Solver

One drawback of prior art systems, as mentioned above, is that each constraint is solved serially. It will be appreciated by one having ordinary skill in the art that position based dynamics solves a system of non-linear constraint functions such that equation (1) below is satisfied.

$$C(x+\Delta x)=0. \qquad (1)$$

This is typically accomplished using Newton's method and multiple Gauss-Seidel iterations, where each constraint is solved in serial. In order to support parallel execution, constraints may first be batched into independent sets where each constraint in a set can be safely solved independently. However, this batching requires additional synchronization between each set, and offers reduced parallelism in tailing sets. To increase parallelism, constraints may be solved in a Jacobi fashion. Unfortunately, Jacobi iteration is not guaranteed to converge if the system matrix is not symmetric positive definite (SPD).

Figure 7:
FIG. 7 illustrates a common constraint configuration where using a Jacobi iteration will not converge to a solution.

FIG. 7 illustrates a common constraint configuration where using a Jacobi iteration will not converge to a solution. FIG. 7 illustrates a 1-dimensional particle constrained to the origin by two distance constraints such that $C_i=x$ for both. The system that needs to be solved can be written as follows:

$$\begin{bmatrix} \Delta C_1 \\ \Delta C_2 \end{bmatrix} [\Delta C_1 \ \Delta C_2] \begin{bmatrix} \lambda_1 \\ \lambda_2 \end{bmatrix} = \begin{bmatrix} -C_1 \\ -C_2 \end{bmatrix} \qquad (2)$$

Because the constraints are identical, the system matrix is rank deficient, and although Gauss-Seidel iteration would find a solution, a Jacobi iteration would oscillate between two fixed solution indefinitely (the positive and negative side of the origin).

One solution to this problem is to perform constraint averaging, or mass-splitting. Accordingly, in one embodiment, the constraint solver of the present invention processes each constraint in parallel and accumulates position deltas for each particle. Once all constraints are processed, each particle's total constraint delta is divided by the number of constraints affecting it, as given by the following equation:

$$\Delta x_i = \frac{1}{n} \sum_n \lambda_i \Delta C_i. \qquad (3)$$

While averaging constraint forces as described by equation 3 guarantees convergence, it also slows convergence significantly. In many cases this averaging is more aggressive than necessary, and so a user-parameter ω is introduced, which controls the rate of successive over-relaxation (SOR), as shown by the following equation:

$$\Delta x_i = \frac{\omega}{n} \sum_n \lambda_i \Delta C_i. \qquad (4)$$

Convergence is still guaranteed for $0<\omega<2$ (provided the system matrix is SPD) and may be set higher based on the scene being simulated.

FIG. 8A illustrates an exemplary procedure for solving constraints in a particle-centric way in accordance with embodiments of the present invention. In the particle centric approach of FIG. 8A, first, a thread is assigned per-particle. For each particle, the procedure then loops over all the constraints affecting it to determine the accumulated position delta for the particle. Finally, a single write operation is performed per-particle once all the constraints are processed.

FIG. 8B illustrates an exemplary procedure for solving constraints in a constraint-centric manner in accordance with embodiments of the present invention. In the constraint-centric procedure, each constraint is assigned its own thread.

For each constraint, the procedure loops over all the particles and uses atomic operations to scatter position deltas to each affected particle.

In one embodiment of the present invention, a mixture of particle-centric and constraint-centric procedures can be used depending on the constraint type. For example, fluid density constraints are solved in a particle centric manner, and distance constraints are solved in a constraint centric manner.

FIG. 9 illustrates an exemplary procedure for a unified solver to simulate visual effects using particles as building blocks in accordance with embodiments of the invention. Each stage of the procedure illustrated in FIG. 9 can, in one embodiment, be executed in parallel on a GPU typically with a single thread per particle.

The procedure illustrated in FIG. 9 can be divided into four different stages. At stage 902, the new velocities and positions of all the particles in the system are predicted based on external forces applied to the particles in the system. Next at stage 904, neighboring particles are found for each of the particles in the system.

At stage 906, the procedure iterates over a plurality of constraints, e.g., density constraints, rigid constraints, distance constraints, pressure constraints, and contact constraints and solves each of the constraints for all particles in parallel. In other words, all constraints of a particular type are solved across all particles in parallel, typically by one or more GPUs, regardless of the type of object or material the particle is being used to model. For example, density constraints at step 10 for all particles in the system are solved in parallel before rigid constraints at step 11. Typically, each step in stage 906 would be executed in parallel on the GPU with 1 thread per particle, or 1 thread per constraint, as desired. It should be noted that that the constraints illustrated within stage 906 are not the only type of constraints that can be solved for as part of the procedure.

Finally, at stage 908, the velocities and positions are updated for each of the particles. Further, velocity level forces such as viscosity and friction are applied to the particles. It will be appreciated that the positions and velocities for the particles can be further adjusted to achieve other simulated properties, effects, and/or phenomena e.g. vorticity confinement, viscosity, etc. as disclosed in U.S. patent application Ser. No. 14/102,323, filed Dec. 10, 2013, entitled "POSITION BASED FLUID DYNAMICS SIMULATION," naming Miles Macklin and Matthias Müller as inventors.

It will be appreciated that the procedure illustrated in FIG. 9 is only one of several ways for a unified solver to simulate visual effects, e.g., rigid bodies, fluids, clothes, etc. using particles as building blocks. Many variations of the procedure illustrated in FIG. 9 are possible that attain the same result.

It should also be noted that the constraints are solved in a parallel Jacobi fashion. As discussed above, in one embodiment, constraint averaging, or mass-splitting, can be performed in order to guarantee convergence. When multiple constraints are acting on a particle, for example, many distance constraints in cloth, it is necessary to divide the resulting change in position by N, wherein N is the number of constraints acting on the particle. By comparison, other unified solvers do not use constraint-averaging or mass splitting to attain convergence.

Collision Detection

In one embodiment, particle to particle interactions are found using discrete overlap tests at the beginning of a time step. If particles move significantly during constraint solving, then subsequent new collisions may be missed. In order to avoid this occurring, in one embodiment, the unified solver of the present invention allows the collision radius to expand by a fixed percentage during the overlap checks.

In one embodiment, particle to shape interactions are also detected using discrete overlap tests at the beginning of the time-step. Again, the particle radius is expanded by a fixed percentage when detecting overlaps to avoid missing collisions during the constraint solve. One exception to this, however, applies in the event of particle to triangle collision detection. Because triangles have no thickness, particles can easily tunnel through the surface if no special care is taken.

In one embodiment of the present invention, the unified solver addresses this by performing continuous collision detection (CCD) against the triangle mesh. As the particles have a finite size, a swept-sphere or capsule-triangle test could be used in one embodiment, however, this is a relatively expensive intersection test.

In one embodiment of the present invention, the unified solver may perform a less expensive test to detect particle to triangle collisions called the "lollipop test." FIG. 10A illustrates the manner in which the "lollipop test" determines a line-segment to triangle intersection according to embodiments of the invention. To carry out the lollipop test, the solver first performs a line-segment 1070 to triangle 1060 test from the particle's frame start position and the particle's position post-constraint solve. If a hit is detected, the solver rewinds the particle back to the time of impact. If this first check fails, it is still possible that an intersection is occurring. FIG. 10B illustrates the manner in which the "lollipop test" determines a line-segment to triangle intersection using a sphere to triangle overlap test. To detect an intersection, the solver performs a sphere 1020 to triangle 1010 overlap test at the particle's end position and projects back along the velocity vector to resolve the collision.

In one embodiment, collision filtering can be performed during stage 904 so that particles in different phases do not generate collisions. The exception is fluid particles, or particles with phase identifier 0 as discussed above, which collide with all other particles. In one embodiment, more complex filtering could be implemented based on integer bit-masks.

Friction

In one embodiment, the solver applies friction at the position level. Conventional solvers do not model nonholonomic constraints like friction well because these effects are handled by applying forces in a single pass after the position constraints have been solved. This leads to particle drift and makes it difficult to model stiction.

Embodiments of the present invention overcome this issue by applying friction at the position level. When resolving a contact, the solver first projects the particle to a non-overlapping position along the collision normal to obtain x*. The solver then projects the particle's position delta, $x^*-x_0$, into the contact plane and scales tangential movement by a given friction coefficient, $\mu$. The frictional contact delta can therefore be given by the following equation:

$$\Delta x_- = \mu(x^*-x_0)\perp n \quad (5)$$

Particle Sleeping

Position drift may occur at times when constraints are not fully satisfied at the end of a time-step. In order to avoid drift and to approximate static friction, in one embodiment, the solver freezes particles with a velocity lower than some user-defined threshold. This can be represented by the following system of equations:

$$x(t + \Delta t) = \begin{cases} x^*, & |x^* - x_0| > \epsilon \\ x_0, & \text{otherwise} \end{cases} \quad (6)$$

Rigid Shape Matching

As discussed above, the unified solver of the present invention uses a particle representation to simulate rigid bodies on the GPU. Conventional methods used force based models to simulate rigid bodies. Embodiments of the present invention, by comparison, maintain rigidity using shape matching constraints.

Shapes are sampled, in one embodiment, by voxelizing triangles meshes and generating particles at occupied cells. Because particles in a shape typically overlap, the solver assigns all particles in a shape the same phase identifier and disables collisions between them.

Each shape matching constraint comprises a list of particle indices in the system, their local positions relative to the center of mass in the rest pose, and a stiffness value. In order to ensure particles remain rigid with respect to each other, the solver stores their position in a local coordinate system and then applies the concept of rigid shape-matching at step 12 of the procedure illustrated in FIG. 9 to find the least squares best rigid transform to match the local space positions to the deformed world space positions. In order to allow plastic deformation, in one embodiment, the solver additionally allows some user-configurable amount of deformation to be added back into the local space rest positions.

In one embodiment, small scale deformations for rigid bodies is allowed by the solver through the stiffness parameter of the shape-matching constraint. For larger scale deformation, the solver supports a pressure model based on volume conservation.

Figure 11:
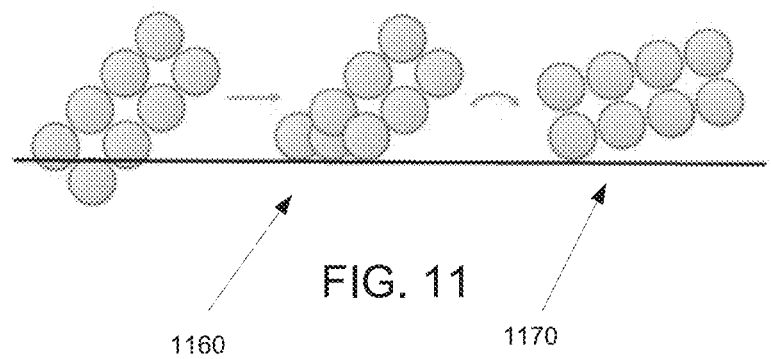
FIG. 11 illustrates how shape matching constraints map deformed particles back to a rigid pose.

FIG. 11 illustrates how shape matching constraints map deformed particles back to a rigid pose. In one embodiment, solving the shape matching constraints requires calculating the least squares best transform from the deformed position 1160 back to the rest pose 1170.

The advantage of this approach is that the solver can collide non-convex shapes by simply considering pairs of overlapping particles. It also provides efficient parallel scaling as the particle representation breaks the scope of the problem down to a smaller granularity.

Figure 12A:
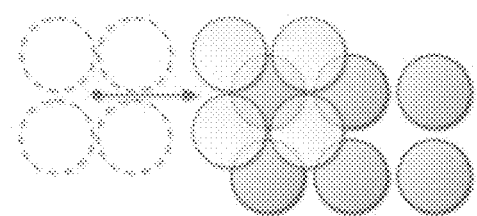
FIG. 12A illustrates the manner in which rigid groups of particles can interpenetrate and become locked together due to discrete collisions.

It is possible for particles to pass through each other and for shapes to become interlocked because the solver is based on discrete collision checks. FIG. 12A illustrates the manner in which rigid groups of particles can interpenetrate and become locked together due to discrete collisions.

Figure 12B:
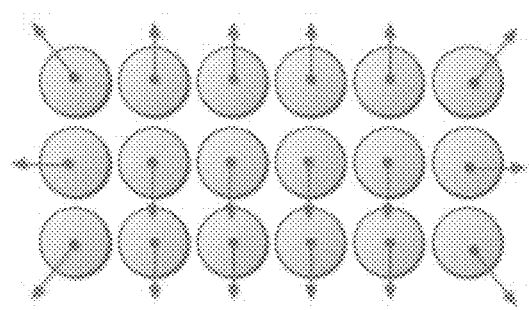
FIG. 12B illustrates the manner in which the solver stores a directional field per particle to prevent rigid interpenetration and locking in accordance with an embodiment of the invention.

FIG. 12B illustrates the manner in which the solver stores a directional field per particle to prevent rigid interpenetration and locking in accordance with an embodiment of the invention. As shown in FIG. 12B, in order to address this issue, the solver stores a vector for each particle that represented the direction of minimum translation required to resolve the collision when particles collide. Alternatively, if the shape's particle sampling is generated from a signed distance field, the field's gradient direction can be used. This can be viewed as a sparse sampling of the shape's collision function stored on the particles. Because this field is invalidated under deformation, the solver uses the deformation gradient calculated during shape-matching to approximately deform the vector field accordingly.

Fluids

Fluids are simulated by the solver of the present invention using the method disclosed in U.S. patent application Ser. No. 14/102,323, filed Dec. 10, 2013, entitled "POSITION BASED FLUID DYNAMICS SIMULATION," naming Miles Macklin and Matthias Müller as inventors, wherein the fluid density constraint is considered as another constraint in the system.

In one embodiment, to allow fluids and other types of particles to interact, the solver includes non-fluid particles (particles with a phase identifier >0) in the density estimate for fluid particles. The solver then initializes density at a non-fluid particle to be equal to the rest density, which ensures fluid particles are separated from the non-fluid particles. Stated differently, the solver supports solid and fluid interactions by letting solid particles participate in the fluid density estimation. Then, if two particles are overlapping and at least one is a solid particle, both are treated as solid particles with the fluid rest distance used as the contact distance.

Different density ratios can be incorporated into the position based fluids method by weighting constraint deltas by the particle inverse mass $w_i = 1/m_i$:

$$\Delta p_i = -w_i \lambda \nabla_{P_i} C(p_1 \ldots p_n) \quad (7)$$

$\lambda$ in equation 7 includes the sum of weights in the denominator $$\lambda = -\frac{C(p_1, \ldots, p_n)}{\sum_i w_i |\nabla_{P_k} C(p_1 \ldots p_n)|^2}. \quad (8)$$

Figure 13:
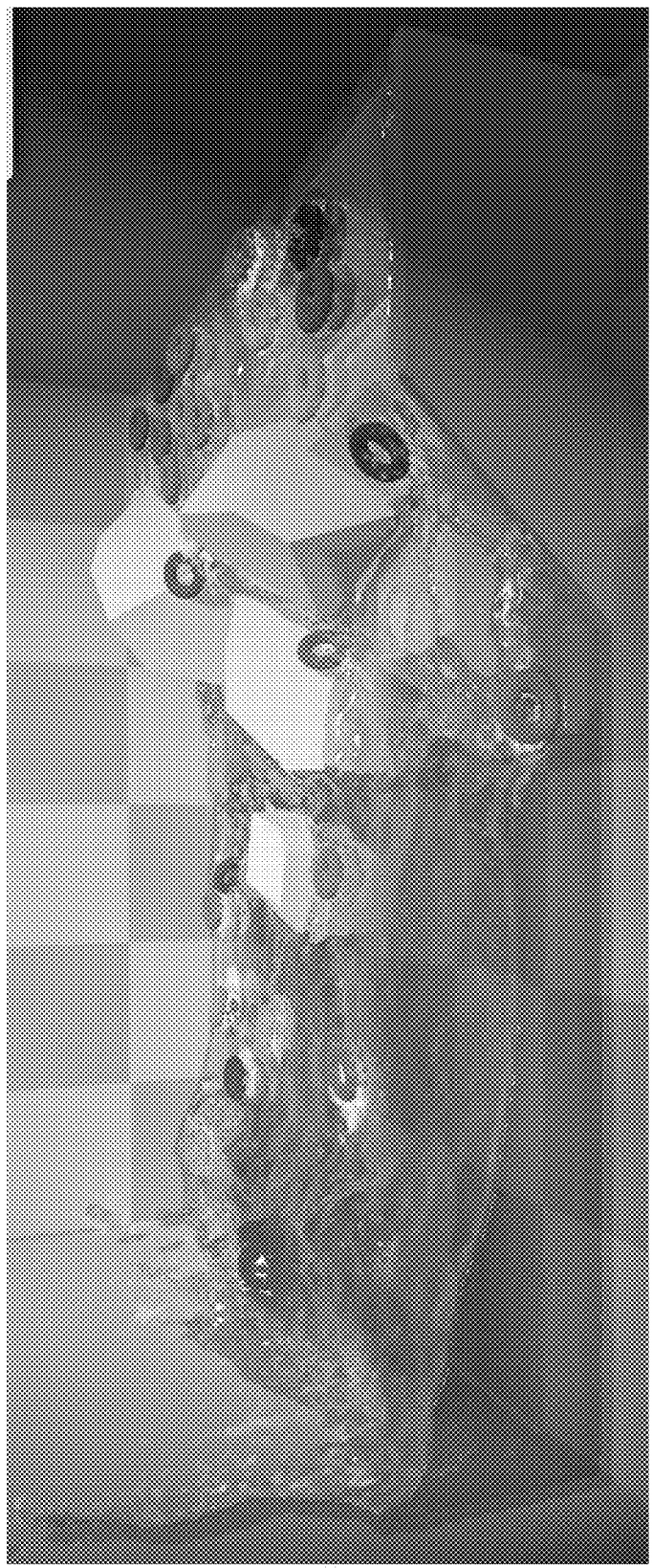
FIG. 13 illustrates the manner in which assigning particles different masses gives rise to buoyancy in accordance with embodiments of the invention.

This automatically gives rise to buoyancy and sinking of objects with differing mass ratios. FIG. 13 illustrates the manner in which assigning particles different masses gives rise to buoyancy in accordance with embodiments of the invention.

Gases

Figure 14:
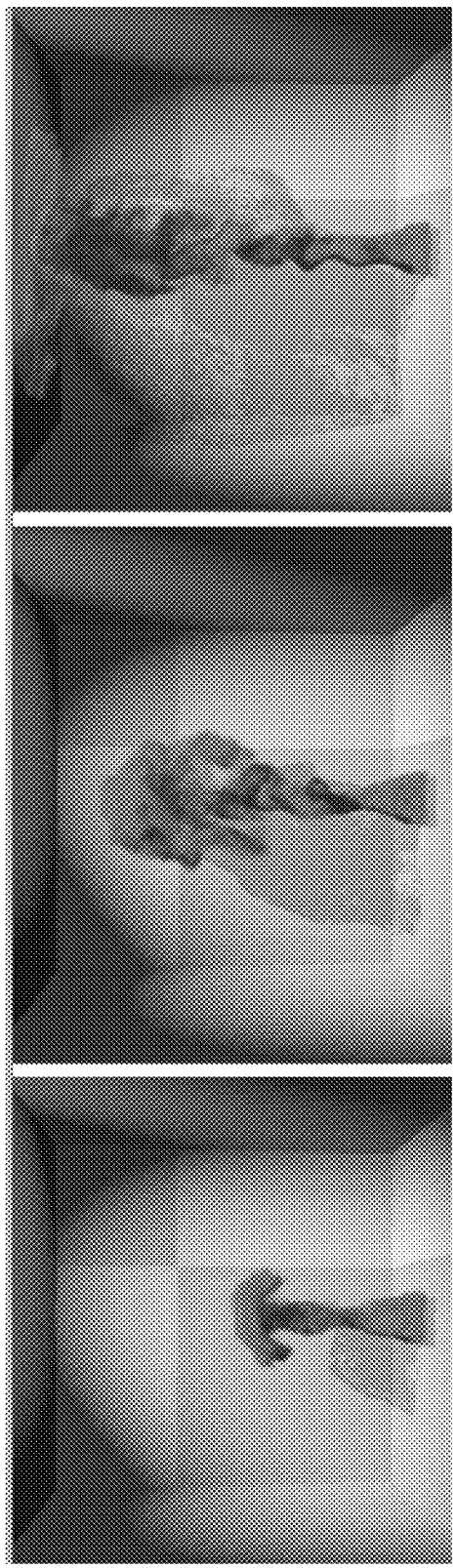
FIG. 14 illustrates the manner in which a rising smoke plume is simulated using position based fluids in accordance with embodiments of the invention.

In one embodiment, the solver simulates gases using position based fluids by filling the computation domain with fluid particles, lowering gravity, and increasing drag. In one embodiment, smoke is modeled by injecting diffuse particles into the simulation and passively advecting them through the fluid's velocity field. This velocity is then used to apply a drag force to the diffuse particles. This same mechanism of passive diffuse particles is also used for foam and spray in water simulation. FIG. 14 illustrates the manner in which a rising smoke plume is simulated using position based fluids in accordance with embodiments of the invention.

Clothing

Figure 15:
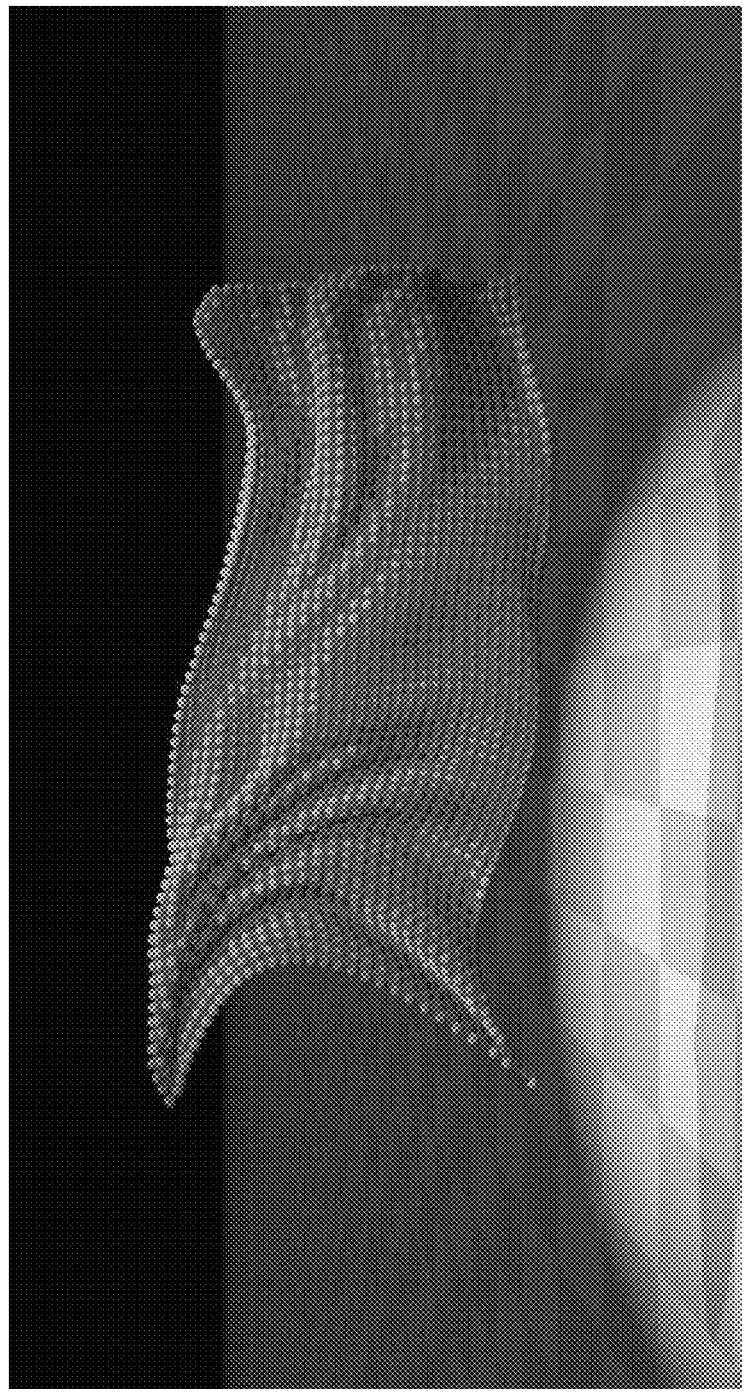
FIG. 15 illustrates a flag blowing in the wind in accordance with embodiments of the invention.

FIG. 15 illustrates a flag blowing in the wind in accordance with embodiments of the invention. In one embodiment, clothing models are built using networks of distance constraints. In addition to the basic distance constraint, unilateral distance constraints ("tethers") are used as long range attachments to reduce stretching. Cloth self-collision and inter-collision with other cloth pieces is handled automatically by the particle collision pipeline. This requires sampling the cloth surface with enough particles to prevent tunneling.

Granular Materials

Figure 16:
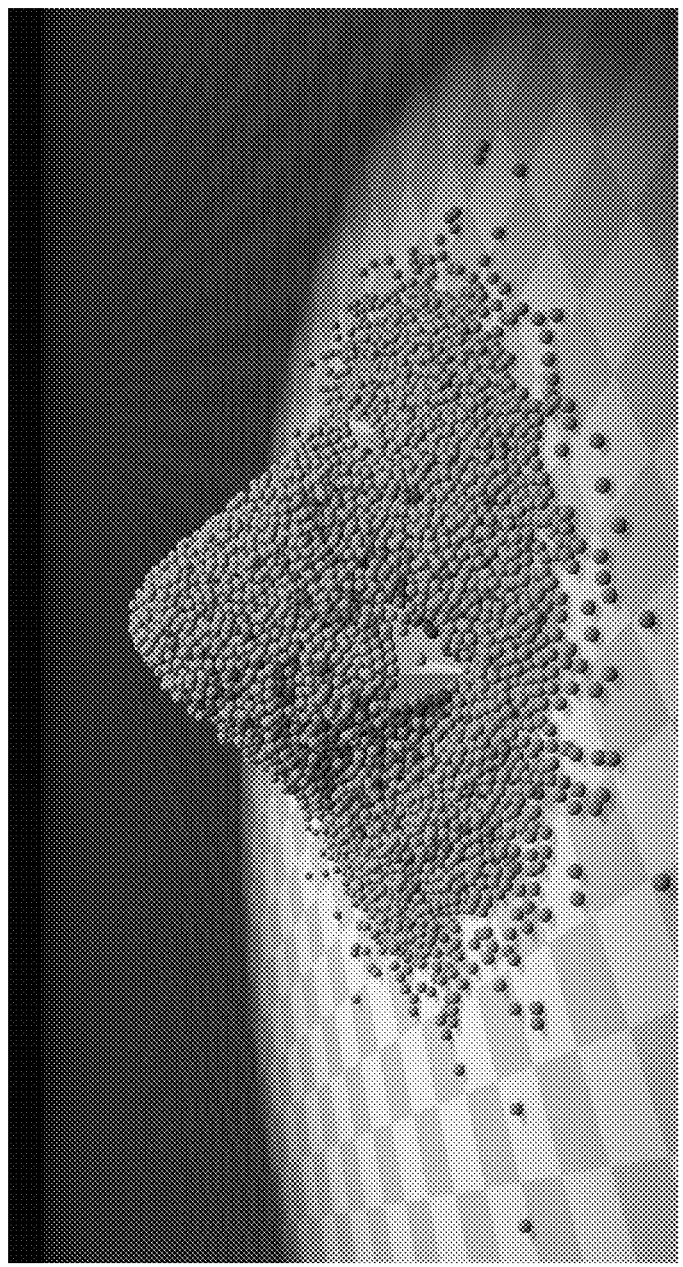
FIG. 16 illustrates particles forming a heap with a high angle of repose in accordance with embodiments of the invention.

FIG. 16 illustrates particles forming a heap with a high angle of repose in accordance with embodiments of the invention. The solver treats particles as rigid spheres and applies an iterative position based friction model, as discussed above, and aggressive particle sleeping, also discussed above, to form large piles of particles with high angles of repose.

Materials like sand are highly dissipative, so to accelerate settling and to encourage heap formulation, an additional dissipation term is introduced based on the particle neighbor count, c. This dissipation term is designed to model the dissipation chains that exist in real world granular materials. After the position solve, the velocity is scaled in accordance with equation 9 below:

$$v_i = v_i * \max(0, 1 - \gamma c), \quad (9)$$

wherein $\gamma$ is a user parameter constant for the scene.

Figure 17:
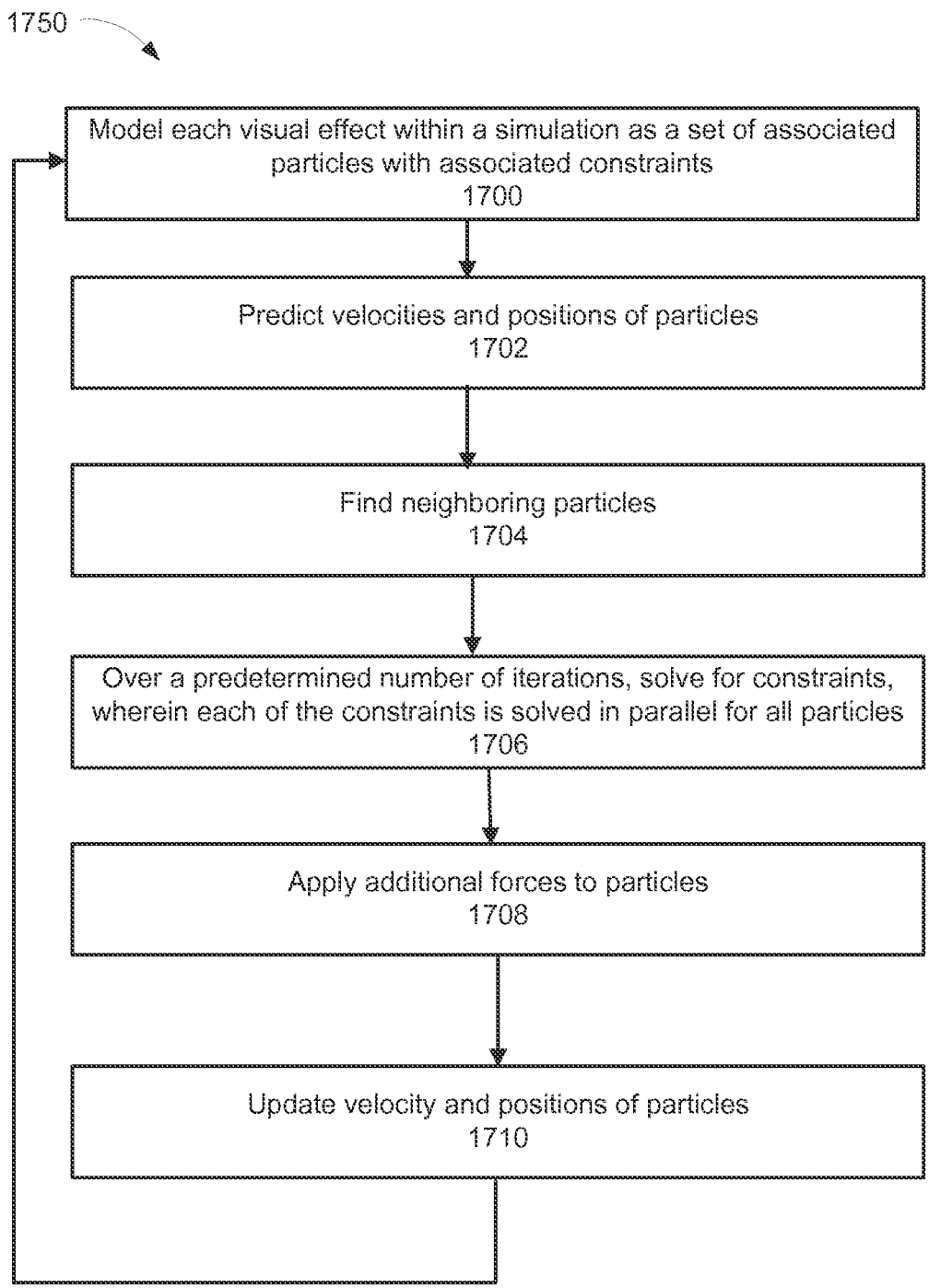
FIG. 17 depicts a flowchart of an exemplary process flowchart of a computer-implemented method of simulating visual effects in accordance with embodiments of the invention.

FIG. 17 depicts a flowchart 1750 of an exemplary process flowchart of a computer-implemented method of simulating visual effects in accordance with embodiments of the present invention. The invention, however, is not limited to the description provided by flowchart 1750. Rather, it will be apparent to persons skilled in the relevant art(s) from the teachings provided herein that other functional flows are within the scope and spirit of the present invention.

At block 1700, each visual effect is modeled within a simulation as a set of associated particles with associated constraints applicable thereto.

At block 1702, the new velocities and positions of the particles in the system are predicted as discussed in connection with stage 902 of FIG. 9.

At block 1704, neighboring particles are found for each of the particles in the system as discussed in connection with stage 904 of FIG. 9.

At block 1706, as discussed in connected with stage 906 of FIG. 9, the solver iterates over a plurality of constraints, e.g., density constraints, rigid constraints, distance constraints, pressure constraints, and contact constraints and solves each of the constraints for all particles in parallel typically by GPUs. In other words, all constraints of a particular type are solved across all particles in parallel regardless of the type of object or material the particles are being used to model. For example, density constraints at step 10 of FIG. 9 for all particles in the system are solved in parallel before rigid constraints at step 11. Typically, each step in stage 906 of FIG. 9, for example, would be executed in parallel on the GPU with 1 thread per particle.

At block 1708, velocity level forces such as viscosity and vorticity confinement are applied to the particles.

Finally at block 1710, the velocities and positions are updated for each of the particles. Subsequently, this sequence of steps can be repeated for other particles or can be repeated for the same particles in response to a new force applied to the particles.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method of simulating visual effects, said method comprising:
    modeling each visual effect within a simulation as a set of associated particles with associated constraints applicable thereto;
    predicting first velocities and first positions of a plurality of particles being used to simulate a visual effect based on an external force applied to said plurality of particles;
    identifying a set of neighboring particles for each of said plurality of particles;
    solving a plurality of constraints iteratively related to said visual effect, wherein each of said plurality of constraints is solved for said plurality of particles in parallel; and
    responsive to said solving, determining second velocities and second positions for said plurality of particles.

2. The method of claim 1, wherein said determining further comprises:
    applying a plurality of secondary forces to said plurality of particles;
    determining said second positions for said plurality of particles based on said solving and said plurality of secondary forces; and
    determining said second velocities for said plurality of particles based on a respective difference between said first positions and said second positions.

3. The method of claim 1, wherein said visual effect is selected from a group consisting of: rigid bodies, fluids, clothing, and granular materials.

4. The method of claim 2, wherein a secondary force from said plurality of secondary forces is selected from a group consisting of: friction, viscosity, vorticity confinement and dissipation.

5. The method of claim 1, wherein said solving comprises solving each of said plurality of constraints for said plurality of particles in parallel on a graphics processing unit (GPU), and wherein each of said plurality of particles is executed in a discrete thread on said GPU.

6. The method of claim 1, wherein said solving comprises solving said plurality of constraints in accordance with a parallel Jacbobi method using constraint averaging.

7. The method of claim 1, wherein said plurality of constraints are selected from a group consisting of: density constraints, rigid constraints, distance constraints, pressure constraints, and contact constraints.

8. The method of claim 6, wherein solving said contact constraints comprises storing a phase identifier for each of said plurality of particles, wherein each type of said visual effect is assigned a unique phase identifier, and further wherein said unique phase identifier is operable to prevent collisions between particles with different phase identifier values.

9. A non-transitory computer-readable storage medium having stored thereon, computer executable instructions that, if executed by a computer system cause the computer system to perform a method of simulating visual effects, said method comprising:
  modeling each visual effect within a simulation as a set of associated particles with associated constraints applicable thereto;
  predicting first velocities and first positions of a plurality of particles being used to simulate a visual effect based on an external force applied to said plurality of particles;
  identifying a set of neighboring particles for each of said plurality of particles;
  solving a plurality of constraints iteratively related to said visual effect, wherein each of said plurality of constraints is solved for said plurality of particles in parallel; and
  responsive to said solving, determining second velocities and second positions for said plurality of particles.

10. The computer-readable medium as described in claim 9, wherein said determining further comprises:
  applying a plurality of secondary forces to said plurality of particles;
  determining said second positions for said plurality of particles based on said solving and said plurality of secondary forces; and
  determining said second velocities for said plurality of particles based on a respective difference between said first positions and said second positions.

11. The computer-readable medium as described in claim 9, wherein said visual effect is selected from a group consisting of: rigid bodies, fluids, clothing, and granular materials.

12. The computer-readable medium as described in claim 10, wherein a secondary force from said plurality of secondary forces is selected from a group consisting of: friction, viscosity, vorticity confinement and dissipation.

13. The computer-readable medium as described in claim 9, wherein said solving comprises solving each of said plurality of constraints for said plurality of particles in parallel on a graphics processing unit (GPU), and wherein each of said plurality of particles is executed in a discrete thread on said GPU.

14. The computer-readable medium as described in claim 9, wherein said solving comprises solving said plurality of constraints in accordance with a parallel Jacbobi method using constraint averaging.

15. The computer-readable medium as described in claim 9, wherein said plurality of constraints are selected from a group consisting of: density constraints, rigid constraints, distance constraints, pressure constraints, and contact constraints.

16. The computer-readable medium as described in claim 9, wherein solving said contact constraints comprises storing a phase identifier for each of said plurality of particles, wherein each type of said visual effect is assigned a unique phase identifier, and further wherein said unique phase identifier is operable to prevent collisions between particles with different phase identifier values.

17. A system for simulating visual effects, said system comprising:
  a memory storing information related to a unified position based solver;
  a processor coupled to said memory, said processor operable to implement a method of solving for visual effects, said method comprising:
    modeling each visual effect within a simulation as a set of associated particles with associated constraints applicable thereto;
    predicting first velocities and first positions of a plurality of particles being used to simulate a visual effect based on an external force applied to said plurality of particles;
    identifying a set of neighboring particles for each of said plurality of particles;
    solving a plurality of constraints iteratively related to said visual effect, wherein each of said plurality of constraints is solved for said plurality of particles in parallel; and
    responsive to said solving, determining second velocities and second positions for said plurality of particles.

18. The system of claim 17, wherein said determining further comprises:
  applying a plurality of secondary forces to said plurality of particles;
  determining said second positions for said plurality of particles based on said solving and said plurality of secondary forces; and
  determining said second velocities for said plurality of particles based on a respective difference between said first positions and said second positions.

19. The system of claim 17, wherein said visual effect is selected from a group consisting of: rigid bodies, fluids, clothing, and granular materials.

20. The system of claim 18, wherein a secondary force from said plurality of secondary forces is selected from a group consisting of: friction, viscosity, vorticity confinement and dissipation.

21. The system of claim 17, wherein said solving comprises solving each of said plurality of constraints for said plurality of particles in parallel on a graphics processing unit (GPU), and wherein each of said plurality of particles is executed in a discrete thread on said GPU.

22. The system of claim 17, wherein said solving comprises solving said plurality of constraints in accordance with a parallel Jacbobi method using constraint averaging.

23. The system of claim 17, wherein said plurality of constraints are selected from a group consisting of: density constraints, rigid constraints, distance constraints, pressure constraints, and contact constraints.

24. The system of claim 17, wherein solving said contact constraints comprises storing a phase identifier for each of said plurality of particles, wherein each type of said visual effect is assigned a unique phase identifier, and further wherein said unique phase identifier is operable to prevent collisions between particles with different phase identifier values.

25. The system of claim 17, wherein said unified position based solver is operable to allow two-way coupling between different types of particles.

\* \* \* \* \*